United States Patent [19]
Rouch

[11] 3,918,770
[45] Nov. 11, 1975

[54] PIVOTED BEARING PAD APPARATUS AND RESTRAINING ARRANGEMENT THEREFOR

[75] Inventor: Keith E. Rouch, Greendale, Wis.
[73] Assignee: Allis-Chalmers Corporation, Milwaukee, Wis.
[22] Filed: June 12, 1974
[21] Appl. No.: 478,736

[52] U.S. Cl. .................................. 308/2 R; 308/73
[51] Int. Cl.² ........................................ F16C 11/02
[58] Field of Search ................. 308/73, 72, 2 R, 160

[56] References Cited
UNITED STATES PATENTS

| | | | |
|---|---|---|---|
| 3,022,123 | 2/1962 | Gruber | 308/73 |
| 3,604,768 | 9/1971 | Decker | 308/73 |

*Primary Examiner*—M. Henson Wood, Jr.
*Assistant Examiner*—Gene A. Church
*Attorney, Agent, or Firm*—Robert C. Sullivan

[57] ABSTRACT

An arrangement for restraining pivoted bearing pads of a pivoted pad journal bearing against movement from an approximate required location and for maintaining a substantially proper circumferential distance between adjacent bearing pads while still allowing sufficient freedom of pivotal movement to the respective bearing pads as required, such as pivotal movement required for formation of the oil film between the bearing pads and the rotating journal. A pair of adjacent pivoted bearing pads are each respectively pivotally connected to a connecting link between the two pads, with the connecting link and its pivoted connections to the bearing pads lying on substantially a common line with the pivot points of the two connected bearing pads. This construction provides a geometric configuration which permits small pivotal movements of the connected pivoted bearing pads with very little resisting movement. A plurality of pivoted bearing pads (such as four, for example) may be connected in the manner just described, and one pad or link of the plurality should preferably be fastened to the stationary support to prevent simultaneous translational motion of all pads in a circumferential direction. A further advantage of the subject construction is that it maintains substantial parallelism in a circumferential direction between the shoulders of the journal or trunnion and the corresponding facing axial ends of the bearing pad by preventing excessive rotation of the bearing pad about its radial axis to thereby insure maintenance of a satisfactory hydrodynamic oil film at the interface between the journal and the pivoted bearing pad.

7 Claims, 6 Drawing Figures

PIVOTED BEARING PAD APPARATUS AND RESTRAINING ARRANGEMENT THEREFOR

BACKGROUND OF THE INVENTION

1. Field of the Invention

This invention relates to journal bearings of the pivoted pad type and more particularly to a pivoted pad journal bearing arrangement which includes means for restraining the bearing pads in an approximate required location while still allowing the bearing pads sufficient freedom to pivot as required.

2. Description of the Prior Art

The use of a plurality of pivoted bearing pads to support a rotating journal is per se well-known in the prior art. Examples of pivoted pad bearings are shown, for example, by U.S. Pat. Nos. 1,161,721 to Parsons and 3,022,123 to Gruber. As a general rule, the frictional force at the pivot points of the respective bearing pads is sufficient to prevent translational motion of the pad relative to the support. However, in case the friction force is insufficient it is necessary to provide some means of locating the pads in an approximate required location while still allowing freedom of the respective bearing pads to pivot about their respective pivotal supports as required for formation of the oil film between the bearing pads and the rotating journal, and as also required by various conditions which occur during the operation of the apparatus which is journalled for rotation.

Various arrangements have been proposed in the prior art for restraining pivoted bearing pads to an approximate required location, but these prior art devices generally involve the use of some kind of mechanical restraint which the pivoted bearing pad bears against if it is shifted from its nominal location. Such prior art restraining devices may possibly restrain proper pivotal motion of the bearing pad and thus may hinder formation of an optimum oil film between the bearing pad and the rotating journal.

STATEMENT OF THE INVENTION

Accordingly, it is an object of the present invention to provide an arrangement for restraining pivoted bearing pads against movement from an approximate required location while still allowing sufficient freedom of slight pivotal movement to the respective bearing pads for proper formation of the oil film between the bearing pads and the rotating journal, or for pivotal movement required by operating conditions of the rotating journal.

It is a further object of the invention to provide an arrangement which maintains proper circumferential spacing between adjacent bearing pads in a pivoted pad journal bearing.

It is still a further object of the invention to provide an arrangement for restraining pivoted bearing pads in an approximate required location which also serves to maintain the thrust shoulder of the rotating trunnion or journal and the facing axial end of a given bearing pad in substantially parallel relation to each other in a circumferential direction by preventing excessive rotation of the bearing pad about its radial axis, to insure maintenance of a satisfactory hydrodynamic oil film at the interface between the journal and the pivoted bearing pad.

In achievement of these objectives, there is provided in accordance with an embodiment of the invention an arrangement for restraining pivoted bearing pads of a pivoted pad journal bearing against movement from an approximate required location and for maintaining a substantially proper circumferential spacing between adjacent bearing pads while still allowing sufficient freedom of pivotal movement to the respective bearing pads as required, such as pivotal movement required for formation of the oil film between the bearing pads and the rotating journal. A pair of adjacent pivoted bearing pads are each respectively pivotally connected to a connecting link between the two pads, with the connecting link and its pivotal connection to the bearing pads lying on substantially a common line with the pivot points of the two connected bearing pads. This construction provides a geometric configuration which permits small pivotal movements of the connected pivoted bearing pads with very little resisting movement. A plurality of pivoted bearing pads (such as four, for example) may be connected in the manner just described, and one pad or link of the plurality should preferably be fastened to the stationary support to prevent simultaneous translational motion of all pads in a circumferential direction. A further advantage of the subject construction is that it maintains substantial parallelism in a circumferential direction between the shoulders of the journal or trunnion and the corresponding facing axial ends of the bearing pad by preventing excessive rotation of the bearing pad about its radial axis, to thereby insure maintenance of a satisfactory hydrodynamic oil film at the interface between the journal and the pivoted bearing pad.

Further objects and advantages of the invention will become apparent from the following description taken in conjunction with the accompanying drawings in which:

DESCRIPTION OF PREFERRED EMBODIMENT

Figure 1:
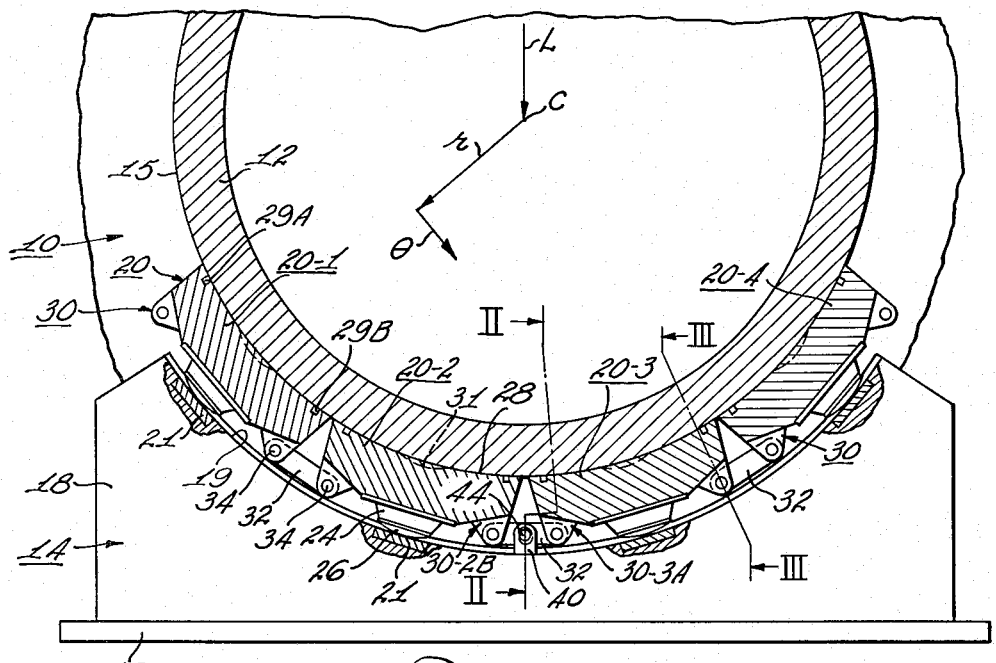
FIG. 1 is a view substantially along line I—I of FIG. 2 showing a grinding mill journalled for rotation in a bearing structure in accordance with the invention.
Figure 2:
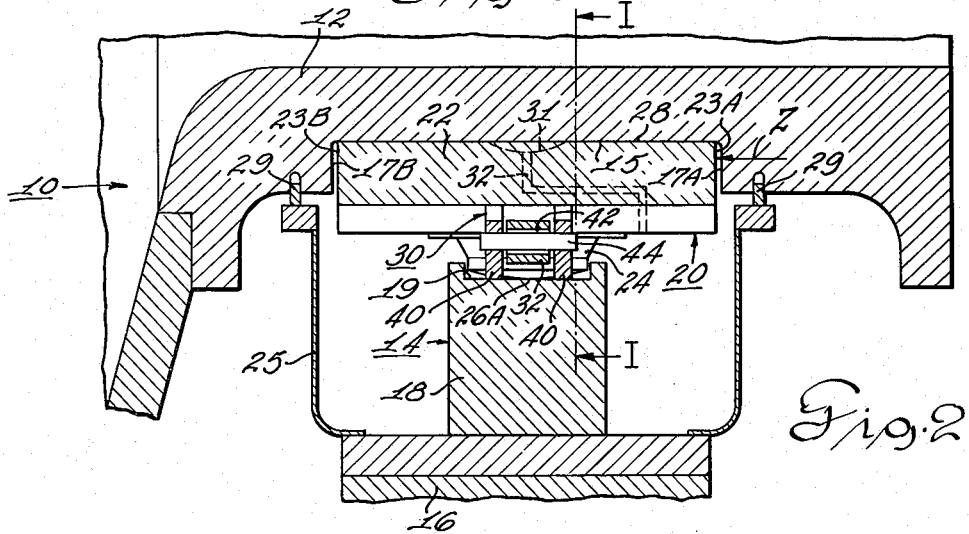
FIG. 2 is a view in axial section along line II—II of FIG. 2.

Referring now to the drawings and more particularly to FIGS. 1 and 2, there is shown a rotary grinding mill generally indicated at 10 of the type used for grinding mineral ore or the like and having a hollow trunnion 12 which is journalled for rotation on a bearing structure generally indicated at 14. The trunnion 12 may be either the inlet trunnion or the discharge trunnion of the grinding mill. A bearing arrangement generally similar to that to be described herein is preferably provided at each of the opposite ends of the mill for supporting the respective inlet and discharge trunnions of the mill.

The bearing structure generally indicated at 14 comprises a normally vertical bearing pedestal 16 on the upper surface of which is suitably mounted an upwardly open bearing support 18. The upper surface 19 of bearing support 18 may be an arcuate portion of a cylinder whose radius is drawn substantially from the longitudinal axis C of trunnion 12. At circumferentially spaced intervals, surface 19 of bearing support 18 is recessed to receive inserts 21 of a suitable supporting material such as high grade hard tool steel for supporting the respective bearing pads 20 to be described. It will be noted that bearing support 18 only extends beneath the lower portion of the periphery of trunnion 12, the arcuate extent of bearing support 18 in the illustrated embodiment being less than 180°, as is common practice in the supporting arrangements for rotating trunnions of grinding mills. A suitable housing 25 is mounted on the upper end of bearing pedestal 16 in enclosing relation to the bearing structure to prevent contamination and loss of bearing lubricant. The upper end of housing 25 supports suitable seals 29 which engage the periphery of the rotating trunnion 12.

A plurality of bearing pads (in the case of the illustrated embodiment, four) each respectively generally indicated at 20 underlie the lower surface of journal or trunnion 12 in supporting relation to the trunnion. A minimum of two bearing pads 20 is required to properly support the journal 12 for rotation. Bearing pads 20 are spaced from each other a short distance circumferentially of trunnion 12. Each bearing pad 20 comprises a pad portion 22 which extends circumferentially and axially of the trunnion 12 in underlying supporting relation to the trunnion. Each bearing pad 20 also includes a pivot support portion 24 which is suitably secured to the radially outer portion of each respective pad portion 22 or which may be integral with the bearing pad portion 22. The radially outer surface 26 of each pivot portion 24 is of spherical contour or of other suitable convex contour which permits the respective bearing pads 20 to undergo small rotations about at least two axes and preferably about all three axes indicated at $r$ (radial), $\theta$ (circumferential) and $z$ (axial) in FIGS. 1 and 2, as dictated by the oil film formed between the radially inner surface 28 of pad portion 22 and the radially outer cooperating surface 15 of the trunnion. The radially outer spherical or convex surface 26 of the pivot support 24 of each respective bearing pad 20 is adapted to bear against one of the inserts 21 in arcuate surface 19 of bearing support 18. Surface 26 of pivot support 24 includes a pivot point 26A about which the pivotal motion of the bearing pad occurs. As seen in FIG. 2 in the illustrated embodiment, pivot point 26A is substantially centrally located relative to the axial dimension of the bearing pad 20. In actual practice, in a large bearing for a grinding mill or the like the pivot "point" 26A may be of the order of magnitude of an inch in diameter.

The outer periphery of the journal or trunnion 12 is provided with an axially extending and circumferentially extending countersunk surface 15 which is adapted to radially overlie the bearing surface 28 of pad 20, and the countersunk surface 15 on the rotating journal 12 is bounded at the opposite axial ends thereof by opposite thrust shoulders on journal 12, respectively indicated at 17A and 17B, which are respectively engageable in thrust relation with corresponding thrust shoulders 23A, 23B on bearing pad 20.

The oil pressure developed in the lubricating oil film at the interface between the radially inner bearing surface 28 of each respective bearing pad portion 22 and the radially outer surface 15 of trunnion 12 supports the load L and may be due to hydrodynamic action of the lubricating fluid (due to relative motion between surfaces 28 and 15) or may be due to hydrostatic operation of the lubricant supplied by a relatively high pressure external pump. During normal running operation, assuming counterclockwise rotation of trunnion 12 as viewed in FIG. 1, low pressure oil is normally supplied to the interface between surface 28 of each bearing pad 20 and surface 15 of trunnion 12 through a discharge passage 29A (FIG. 4) in surface 28 of pad 20 near the leading edge 20A of pad 20 relative to the counterclockwise direction of rotation. During counterclockwise rotation of journal 12, as viewed in FIG. 1, each pad 20 pivots a slight amount to allow development of a thin hydrodynamic wedge-shaped oil film between the rotating journal 12 and bearing pad 20 and extending in from leading edge 20A of the respective pad 20.

If the direction of rotation of trunnion 12 were clockwise relative to FIG. 1, low pressure oil would be supplied to the interface between surfaces 28 and 15 through discharge passage 29B near the "leading" edge 20B for clockwise rotation. During clockwise rotation of journal 12, as viewed in FIG. 1, each pad 20 pivots a slight amount to allow development of a thin hydrodynamic wedge-shaped oil film between the rotating journal 12 and bearing pad 20 and extending in from leading edge 20B of the respective pad 20.

Discharge passages 29A and 29B are supplied by suitable internal passages (not shown) in each bearing pad 20 which in turn are connected to a source of low pressure oil supply. High pressure oil for hydrostatic operation, particularly during the starting-up, shut down and inching operation of the grinding mill, may be supplied through centrally located discharge opening 31 (FIG. 2) in bearing face 28 of the bearing pad 20. Discharge opening 31 is connected by a suitable internal passage 32 in pad 20 to a source of high pressure oil.

Figure 4:
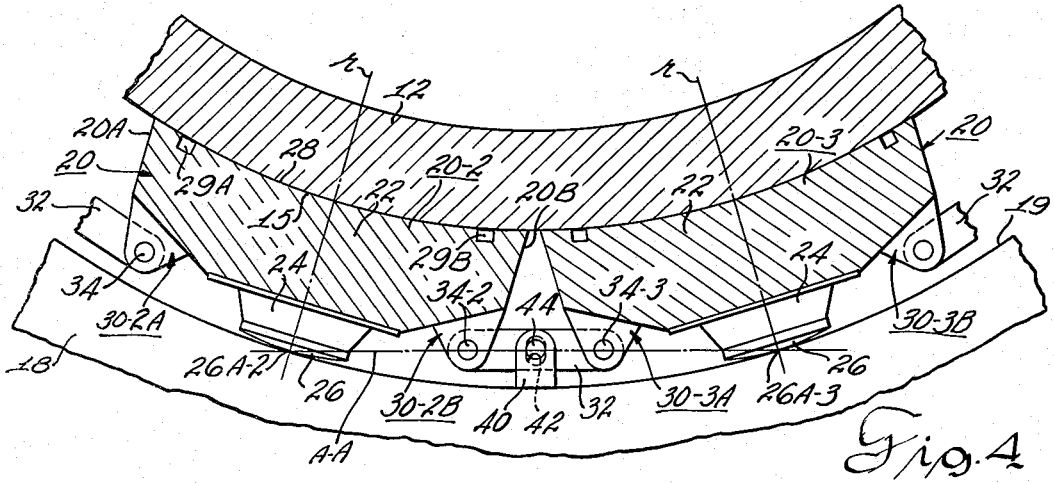
FIG. 4 is an enlarged fragmentary view taken from FIG. 1 and showing two of the pivoted bearing pads of FIg. 1 connected by a link member in accordance with the invention.
Figure 3:
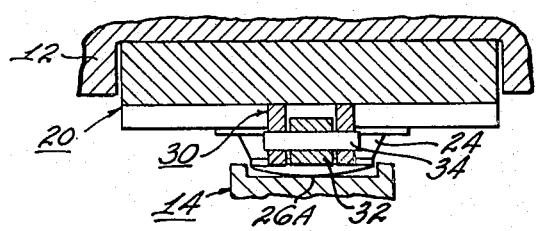
FIG. 3 is a view taken in section along line III—III of FIG. 1.

As seen in the drawings, each pivoted bearing pad 20 includes at each end thereof which is to be connected to an adjacent pad and substantially symmetrically located in the axial dimension (as viewed in FIGS. 2 and 3) about pivot point 26A of the corresponding bearing pad 20 a pair of downwardly depending lug members each generally indicated at 30. The lug members 30 at a given end of a given pivoted bearing pad are spaced apart from each other to pivotally receive one end of a link 32 which is substantially in alignment with pivot point 26A. To distinguish the respective bearing pads 20 from each other, the four bearing pads shown in the view of FIG. 1 have been respectively designated as 20-1, 20-2, 20-3 and 20-4, respectively. The view of FIG. 4 is assumed to be an enlarged view of bearing pads 20-2 and 20-3 and of their connections. The downwardly depending lugs of bearing pad 20-2 have been indicated as 30-2A at the left-hand end thereof relative to FIGS. 1 and 4 and the downwardly depending lugs at the right-hand end of bearing pad 20-2 have been designated as 30-2B. Similarly, the downwardly depending lugs at the left-hand end of pivoted bearing pad 20-3 have been designated as 30-3A and the downwardly depending lugs at the right-hand end of pivoted bearing pad 20-3 have been designated as 30-3B. It will be understood that two downwardly depending lugs are provided at each end of each of the respective bearing pads as seen in FIg. 2 and that the numbers 30-2A, 30-2B, 30-3A and 30-3B in each case designate a pair of lugs similar to the lugs 30 shown in FIG. 2.

The link 32 in FIG. 4 is pivotally connected at its opposite ends to the downwardly depending lugs 30-2B of pivoted bearing pad 20-2 and to the downwardly depending lugs 30-3A of pivoted bearing pad 20-3 by means of pins 34-2 and 34-3, respectively. The pivotal connections of link 32 to pins 34-2 and 34-3 and to lugs 30-2B and 30-3A are a loose fit to permit a little "play" or misalignment at these pivotal connections, while still controlling the location of the bearing pads 20-2, etc. relative to the stationary support. The downwardly depending lugs 30-2A of pivoted bearing pad 20-2 are pivotally connected in a similar manner to that just described to downwardly depending lugs at the right-hand end (relative to FIGS. 1 and 4) of pivoted bearing pad 20-1 by means of a link 32 and pin 34 in the manner just described. Also, the downwardly depending lugs 30-3B of pivoted bearing pad 20-3 are pivotally connected by means of a link 32 and pin 34 to downwardly depending lugs at the left-hand end (relative to FIGS. 1 and 4) of the contiguous pivoted bearing pad 20-4. Thus, all of the pivoted bearing pads 20-1, 20-2, 20-3 and 20-4 are linked together by means of the pivotally connected links 32 connected by pins 34 between downwardly depending lugs 30 on contiguous pivoted bearing pads in the manner described for the connection between bearing pads 20-2 and 20-3.

In order to prevent simultaneous circumferential translational movement of the whole assembly of bearing pads 20 and the connecting links 32 thereof, the whole assembly is anchored relative to stationary structure 18 by means of a pair of laterally spaced upright elements 40 secured to structure 18 and supporting a pin 44 which extends through an enlarged slot 42 in one of the links 32, in this case the link 32 connecting the pivoted bearing pads 20-2 and 20-3 as seen in FIG. 4. The assembly of bearing pads 20-1, 20-2, 20-3 and 20-4 and their pivotally connected link members 32 need only be anchored at one location such as that provided by the members 40 and the pin 44 in FIG. 4. The size and shape of slot 42 in the link 32 is such as to provide a loose connection of link 32 to upright members 40 so as not to restrain any normal pivotal movement of link 32 and of the connected pivoted bearing pads, and yet such as to prevent any significant translational movement in a circumferential direction of the assembly of bearing pads.

A significant feature of the construction is the fact that the center line of each link 32 on which the opposite pivot pins 34-2 and 34-3 lie is essentially coincident with a line A-A (FIG. 4) connecting the pivot points such as 26A-2 and 26A-3 of each pair of contiguous connected pivoted bearing pads. In other words, the pivot points 26A-2, 26A-3 of the respective bearing pads 20-2 and 20-3 and the pivot points defined by pins 34-2 and 34-3 at the opposite ends of link 32 all lie essentially on a common line and in a common plane. This construction provides a geometric configuration which allows a slight change in angular location of the pivoted bearing pads without a large resisting force being exerted by the connecting links 32.

Figure 5:
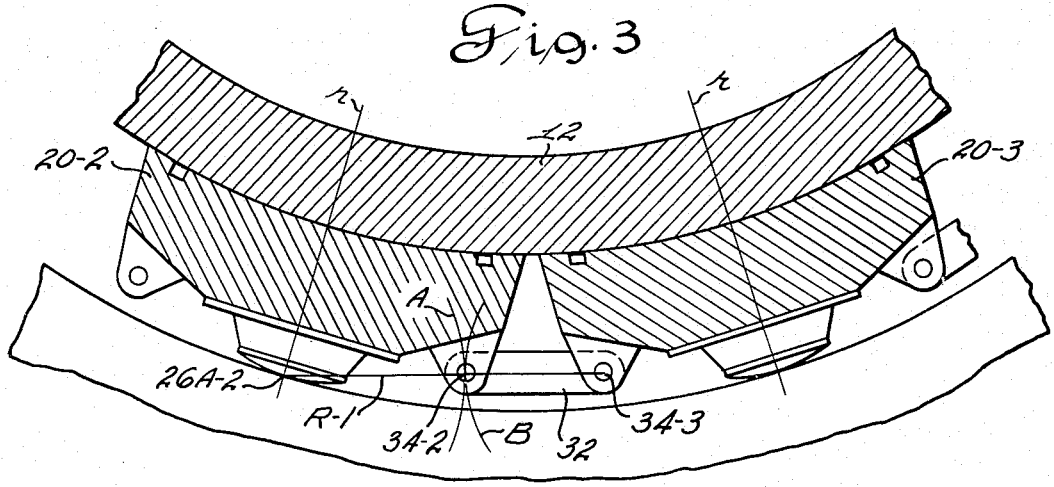
FIG. 5 is a schematic view showing the geometrical relationships provided by the preferred construction of the invention, and assuming that only one of two contiguous bearing pads has rotationally moved.

During operation, when a change in orientation of a pivoted bearing pad such as 20-2 is required for some reason, and assuming that bearing pad 20-3 has not moved, the individual pad 20-2 rotates about its pivot point 26A-2. As seen in FIG. 5, pin 34-2 takes an arcuate path A defined by a rotation on a radius R-1 about the pad pivot 26A-2 as a center, while the arc B described by the end of link 32 connected to pin 34-2 is on a radius drawn from pin 34-3 of the adjacent pad 20-3. For small angles of rotation of the pivoted bearing pads connected in accordance with the present invention, the arcs A and B just mentioned are nearly parallel.

Figure 6:
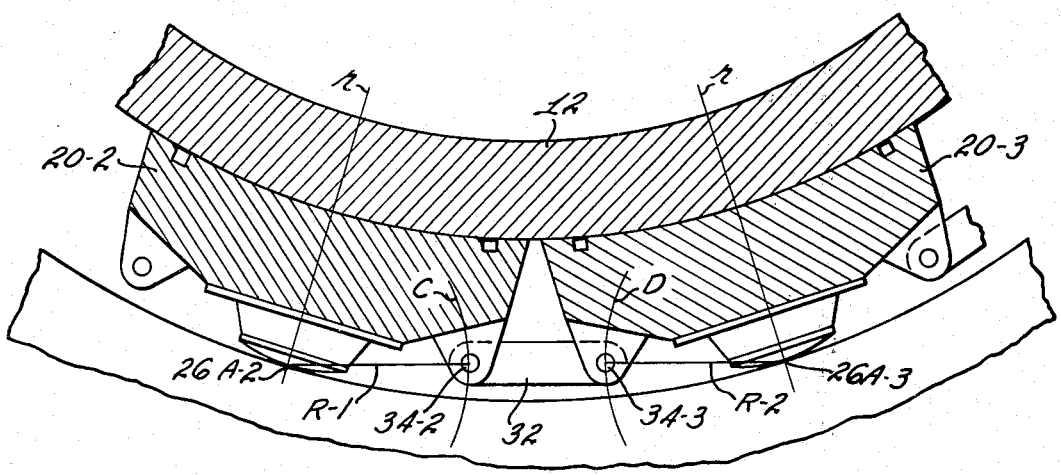
FIG. 6 is a schematic view similar to FIG. 5 but assuming that both contiguous bearing pads have rotationally moved.

Similarly, as best seen in FIG. 6, assume that two adjacent bearing pads 20-2 and 20-3 are both required to rotate slightly in the same given direction, due to a change in direction of rotation of journal 12 or for some other reason. In this case, bearing pad 20-2 rotates about its pivot point 26A-2, while bearing pad 20-3 rotates about its pivot point 26A-3. Pin 34-2 connecting link 32 to bearing pad 20-2 effectively moves on an arc C having a radius R-1 drawn from pivot point 26A-2, while pin 34-3 which connects the same link 32 to bearing pad 20-3 effectively moves on an arc D having a radius R-2 drawn from pivot point 26A-3.

For small rotations of the bearing pads, the arcs A and B are substantially parallel to each other and the arcs C and D are substantially parallel to each other, when the preferred construction hereinbefore described is used in accordance with which pivot pins 34-2 and 34-3 lie substantially on the line A-A connecting pivot points 26A-2 and 26A-3, (FIG. 4) with consequent low resistance to change in angular location of the pivoted bearing pads.

In the event of a large transverse force being applied to a pad 20, so that the pad 20 is caused to move relative to the stationary support, link 32 will restrict motion of pad 20 to the degree allowed by the loose fit of pins 34-2 or 34-3 to the pad 20 and to the link 32. This restrictive action of the links just described applies to motion of the pad in a direction circumferentially of the journal 12 and also to rotation of the pad 20 in its own plane (i.e. — about the radial axis $r$ — FIGS. 1 and 4).

It will be understood that the description of link 32 and its pivotal connections in relation to the line A-A connecting the pivot points 26A-2 and 26A-3 of the contiguous bearing pads 20-2 and 20-3 is illustrative of the relation of any given link 32 and its pivot points to the line connecting the pivot points of the bearing pads which the particular given link connects.

It can be seen from the foregoing that there is provided in accordance with this invention a means for restraining pivoted bearing pads of a pivoted pad journal bearing in an approximate required location while still allowing sufficient freedom of the pads to pivot as necessary, such as for the formation of the oil film required between the bearing pads and the rotating journal.

The linked arrangement of the bearing pads hereinbefore described serves to maintain the pivoted bearing pads in substantially proper circumferentially spaced relation to each other, while still permitting any necessary pivotal movement of the bearing pads. Also, the linked arrangement hereinbefore described maintains substantial parallelism in a circumferential direction between the shoulders of the journal or trunnion and the corresponding facing axial end of a given bearing pad by preventing any excessive rotation of the bearing pad about its radial axis $r$ (FIGS. 1 and 4) to thereby insure a satisfactory hydrodynamic oil film at the interface between the journal surface 15 and the bearing pad surface 28.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an enclusive property or privilege is claimed are defined as follows:

1. A journal bearing of the pivoted pad type comprising a pair of circumferentially spaced pivoted bearing pads positioned contiguous each other on a stationary supporting structure, each bearing pad including a corresponding pivot support means adapting the respective bearing pad for pivotal movement on the stationary supporting structure, each of said pivot support means having a pivot point about which the corresponding bearing pad pivots, a link member pivotally connected to contiguous ends of the respective pivoted bearing pads of said pair, and means carried by the stationary supporting structure and anchoring said link member and said bearing pads against substantial translational movement in a circumferential direction relative to said supporting structure but permitting pivotal movement of said link member and of said pivoted bearing pads.

2. A journal bearing as defined in claim 1 comprising in excess of two circumferentially spaced pivoted bearing pads, a separate link member pivotally connected between each pair of contiguous bearing pads, whereby all of said bearing pads are connected in series with each other, and means anchoring one of said link members to said stationary supporting structure whereby to prevent any substantial simultaneous translational movement in a circumferential direction of the series-connected pivoted bearing pads relative to said supporting structure.

3. A journal bearing of the pivoted pad type comprising a pair of circumferentially spaced pivoted bearing pads positioned contiguous each other on a stationary supporting structure, each bearing pad including a corresponding pivot support means adapting the respective bearing pad for pivotal movement on the stationary supporting structure, each of said pivot support means having a pivot point about which the corresponding bearing pad pivots, a link member pivotally connected to contiguous ends of the respective pivoted bearing pads of said pair, the journal member journalled in said bearing being provided with a countersunk journal surface with which a given bearing pad is in bearing relation, said countersunk journal surface being bounded at the respective opposite axial ends thereof by shoulders on said journal, each axial end of said given bearing pad facing and being substantially parallel relation in a circumferential direction to a corresponding shoulder on said journal, said link member tending to maintain said axial ends of said given bearing pad substantially in said parallel relation to their respective corresponding shoulders on said journal by preventing any excessive rotation of the bearing pad about its radial axis.

4. A journal bearing of the pivoted pad type comprising a pair of circumferentially spaced pivoted bearing pads positioned contiguous each other on a stationary supporting structure, each bearing pad including a corresponding pivot support means adapting the respective bearing pad for pivotal movement on the stationary supporting structure, each of said pivot support means having a pivot point about which the corresponding bearing pad pivots on said stationary supporting structure, a link member pivotally connected to contiguous ends of the respective pivoted bearing pads of said pair, said link member and the pivotal connections thereof to said contiguous pivoted bearing pads and the respective pivot points of the respective pivot support means of said pair of pivoted bearing pads all lying on substantially a common line.

5. A journal bearing as defined in claim 4 comprising in excess of two circumferentially spaced pivoted bearing pads on said stationary supporting structure, a separate link member pivotally connected between each pair of contiguous bearing pads, whereby all of said bearing pads are connected in series with each other, each link member and the pivotal connections thereof to its corresponding pair of contiguous pivoted bearing pads and the respective pivot points of the respective corresponding pivot support means of said corresponding pair of pivoted bearing pads connected by the given link member all lying on substantially a common line.

6. A journal bearing of the pivoted pad type comprising a pair of circumferentially spaced pivoted bearing pads positioned contiguous each other on a stationary supporting structure, each of said bearing pads having a pivot point about which the corresponding bearing pad pivots on said stationary supporting structure, a link member pivotally connected to contiguous ends of the respective pivoted bearing pads of said pair, said link member and the pivotal connections thereof to said contiguous pivoted bearing pads and the respective pivot points of said pair of pivoted bearing pads about which the respective bearing pads pivot on said stationary supporting structure all lying on substantially a common line.

7. A journal bearing as defined in claim 6 comprising in excess of two circumferentially spaced pivoted bearing pads on said stationary supporting structure, a separate link member pivotally connected between each pair of contiguous bearing pads, whereby all of said bearing pads are connected in series with each other, each link member and the pivotal connections thereof to its corresponding pair of contiguous pivoted bearing pads and the respective pivot points about which said corresponding pair of contiguous pivoted bearing pads respectively pivot on said stationary supporting structure all lying on substantially a common line.

* * * * *